United States Patent
Hahne

[15] 3,647,130
[45] Mar. 7, 1972

[54] APPARATUS FOR WELDING SHEET METAL

[72] Inventor: Siegfried Hahne, Hoesel, Germany

[73] Assignee: Messer Griesheim GmbH, Frankfurt am Main, Germany

[22] Filed: Feb. 26, 1970

[21] Appl. No.: 14,401

[30] Foreign Application Priority Data

Mar. 6, 1969 Germany.....................P 19 11 381.6

[52] U.S. Cl.....................................228/5, 219/7.5, 228/6, 228/45
[51] Int. Cl..........................................B23k 1/20
[58] Field of Search ....................228/5, 15, 44, 6.5; 29/475, 29/478, 487, 480; 219/7.5, 128, 155; 242/77.3, 78, 78.1

[56] References Cited

UNITED STATES PATENTS

| 3,279,050 | 10/1966 | Simich | 29/480 |
| 3,191,843 | 6/1965 | Tomkins | 228/5 |
| 2,219,049 | 10/1940 | McArthur | 271/2.6 |
| 2,062,875 | 12/1936 | Gardner | 29/480 X |

*Primary Examiner*—John F. Campbell
*Assistant Examiner*—R. J. Craig
*Attorney*—Ernest F. Marmorek

[57] ABSTRACT

The apparatus comprises a clamping device for gripping the sheets to be welded, and a proper welding device that is combined with the sheet-clamping device to form a first operative unit. This first clamping and welding unit is arranged for displacement in the direction of the feed of the sheets. A heating device adapted for thermal pretreatment and aftertreatment of sheet edges, is combined with a grinding device for leveling the welding joints, to form a second operative unit. This second operative unit is carried by the first operative unit, and further supported for horizontal movement in the direction of the welding joints. The burner of the heating device, and the grinding disc of the grinding device, are vertically adjustable. A sheet gripping device with jaws having arcuate clamping surfaces, is operatively associated with the heating and grinding operative unit.

10 Claims, 3 Drawing Figures

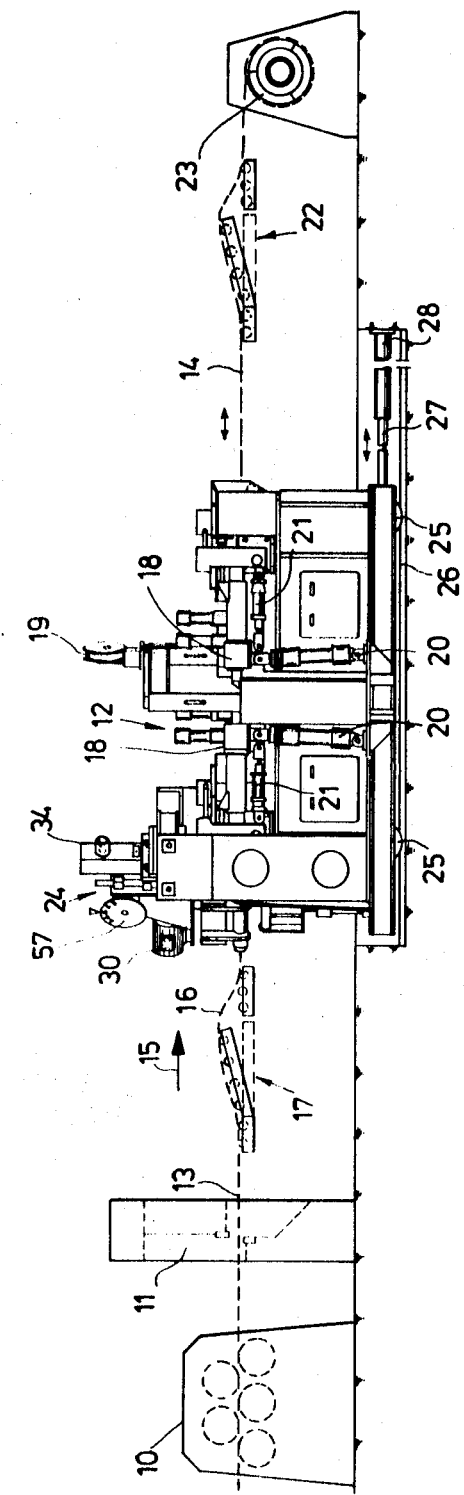

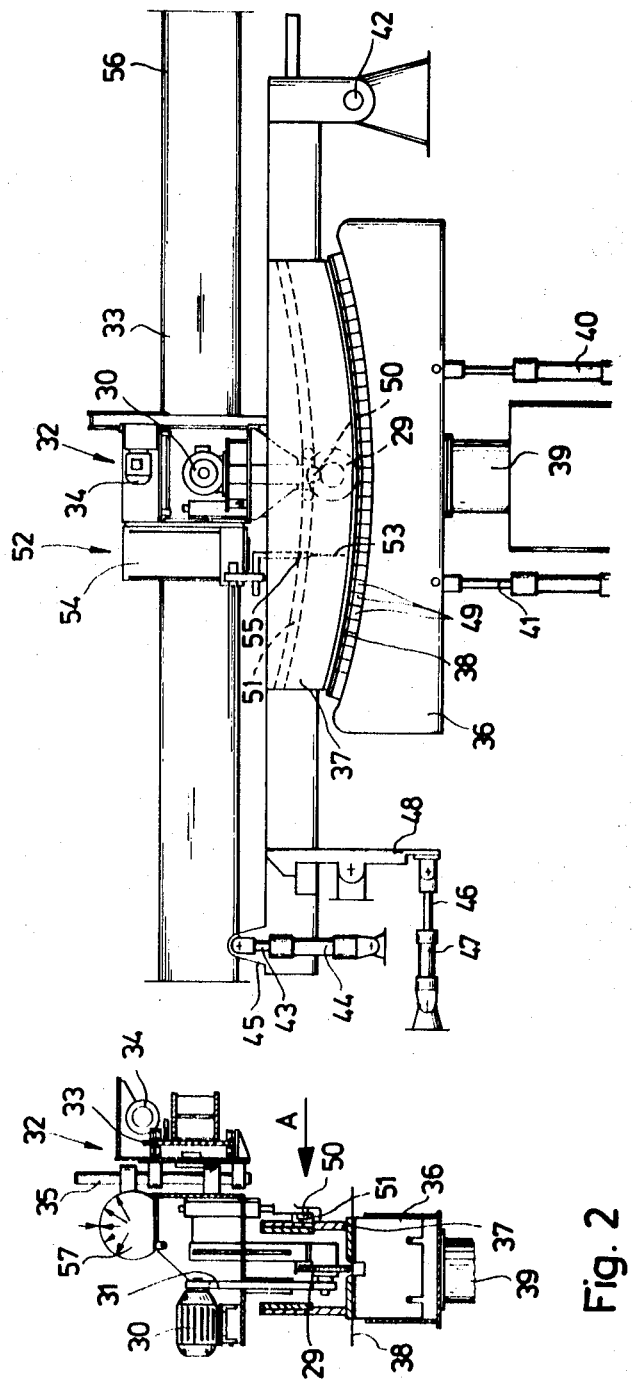

3,647,130

APPARATUS FOR WELDING SHEET METAL

This invention relates generally to an apparatus for welding metal sheets and, more particularly, to a combination of several devices that are employed in a sheet band welding process.

In rolling mills, the finished metal sheets are consecutively connected one to another to enable a continuous operational process and, consequently, to increase the productivity and economy. Preferably, the finished sheets are welded together. For example, transformer or electrical machine sheets are joined in this manner to make easier the subsequent punching operations. Similarly, thick metal strips or tables are welded in a band prior to their advance for further rolling; in this way it is possible to attain heavier coils and thus an improvement in the production economy. In addition, the welded metal sheet bands enable that the feeding speed can be substantially increased and time losses reduced.

If the welding joints are submitted to an aftertreatment such as, for example, tempering, pickling, rolling, etc., there is a possibility that the welding joints in the final product can be left as they are, provided that the quality of aftertreatment is within predetermined tolerances.

For this reason it is evident that the basic condition for such an operational simplification is an accurate adjustment of the sheet edges to be welded on the one hand. On the other hand, the resulting welding joint must be aftertreated with the same accuracy in order to avoid wear and damage of the rolls that might occur due to the differences in thickness between the welding joints and the remaining parts of the sheets. For this purpose, the welding joints must be aftertreated or leveled partly mechanically by grinding, for example, and partly by heating. The thermal treatment of the welding joints, which is by no means less important than the mechanical treatment, equalizes the differences in the grain or structure of the welding joints and the remaining portions of the metal sheets. The thermal pretreatment or aftertreatment is conventionally accomplished by heating the sheet edges to be welded, or the welding seams, by a gas burner.

The prior art aftertreatment devices have the disadvantage, particularly in case of a continuous sheet band processing, that the continuous advance of the working piece must be interrupted in order that the working piece might be treated manually in a complicated and time-consuming manner.

SUMMARY OF THE INVENTION

One of the objects of this invention is, therefore, to avoid the aforementioned drawbacks of the prior art devices for welding sheet metal.

More particularly, an object of this invention is to enable a continuous feed of the welded sheet bands during the entire aftertreatment operation.

Another object of this invention is to provide means for automatic control of the heating and grinding process.

Still another object of this invention is to provide a sheet processing system that facilitates a faster and more economical production of welded metal sheet bands.

In accordance with this invention, these and other objects are attained by combining a clamping and welding device with a heating and grinding device to form a single centrally controlled unit which is capable to perform automatically all sheet processing steps. The heating and grinding device is also designed both for a thermal pretreatment of the sheet edges before the welding and for the aftertreatment of the resulting welding seams.

Since the associated clamping and welding device is usually controlled according to a predetermined program, there is no difficulty in subordinating the heating and grinding unit to the same program, thus completing the full automation.

It is particularly advantageous to locate the heating and grinding unit immediately before the inlet side of the clamping and welding unit and to arrange both the units for a common displacement in a horizontal plane.

Due to the effect of this invention, it is not necessary to interrupt the advance of the welded metal sheet band. The combined units are advanced at an increased speed as far in the feeding direction as the level of the welding seam is attained. At the moment, however, when the aftertreating operating has started, the combined units are advanced at the same speed as the treated sheet bands.

In detail, the heating device has a gas burner which is vertically adjustable and, at the same time, it can be moved in a horizontal plane above the sheets to heat the welding joints of the latter. The grinding device is with advantage provided with a grinding disc which, in the same manner as the aforementioned burner, is vertically adjustable and supported on a carriage. The carriage is guided for horizontal movement along the welding joint.

Since the metal sheets must be firmly clamped during the heating and grinding operation, an additional gripping device is operatively associated with the heating and grinding unit. This gripping device has a vertically movable lower clamping jaw, and a tiltably arranged upper clamping jaw. Both of the jaws are driven by hydraulic driving means, such as pressure cylinders with pistons, for example.

The upper clamping jaw cooperates with a locking device which is also controlled by a hydraulic driving device.

To increase the rigidity of the sheet or of the sheet band during the grinding action, the facing surfaces of the lower and of the upper clamping jaw are arched, to complement each other. Since all surface area of the clamped sheet band must be under a uniform pressure, the arched surface of the lower clamping jaw supports a set of side-by-side arranged segments which are free for a limited lateral displacement for adjusting themselves to the sheet surface.

The adjustment of the vertical positions of the grinding disc and of the heating burner with regard to the arcuate surface of the clamped sheet band is accomplished preferably by means of a correspondingly arcuate guiding groove in which follower fingers both of the burner and of the grinder are guided.

BRIEF DESCRIPTION OF SEVERAL VIEWS OF THE DRAWING

The invention is illustrated by way of example in the accompanying drawing which forms part of the application and in which:

FIG. 1 is a schematic front elevation view of the entire apparatus for welding sheet metal according to this invention;

FIG. 2 is a fragmentary side elevation view, partly in section, of the heating and grinding unit in the apparatus of the invention; and FIG. 3 is a fragmentary front elevation view of the unit of FIG. 2, taken in the direction of arrow A.

DETAILED DESCRIPTION

The apparatus for welding sheet metal as illustrated in FIG. 1 is formed by consecutively arranged sheet metal processing devices such as a straightening device 10, shearing device 11 provided for trimming the edges of incoming sheets, and of the proper welding machine which is combined with a sheet clamping mechanism into a single unit, generally designated by the reference numeral 12. The incoming metal sheets to be welded together are schematically indicated in dotted lines and marked by the reference numerals 13 and 14. In the straightening device 10, there are removed any deformations on the surface of the sheets 13 and 14. Subsequently, the sheets 13 and 14 enter the shearing device 11 where the edge trimming step is completed and for the following step they are fed over buckle tables 17 and 22 to the combined clamping and welding unit 12. By means of the movable arrangement of the clamping and welding unit 12 and by means of the buckle tables 17 and 22, it is possible to create on the sheets 13 and 14 open loops or bendings. The sheet edges are in the following step aligned in parallel, clamped by two pairs of clamping jaws of the clamping device 18 and finally welded together in the welding machine; the welding wire magazine of the welding machine is denoted by 19. The clamping device 18 is actuated by hydraulic drives 20 and 21. After the completion of the welding step, the welded sheet band is forwarded past the buckle table 22 and winded up on the magazine coil 23.

Prior to the winding up of the sheet belt on the spool 23 it is necessary that the resulting welding joints be aftertreated. For this purpose, a combined heating and grinding unit 24 is arranged in front of the inlet side of the clamping and welding unit 12, and forms with the latter a single operative system.

The combined heating and grinding unit 24 according to the invention is shown in greater detail in FIGS. 2 and 3, and will be described in the subsequent paragraphs. The clamping and welding unit 12 is supported on wheels 25 and can be moved on rails 26 extending in the direction of the feed. The displacement of the clamping and welding unit 12 is controlled by a hydraulical drive comprising a hydraulic cylinder 28 and piston 27.

The aftertreatment of the welding joints without the interruption of the advancement of the sheet belt can be effected as follows:

Upon the completion of the welding step and after the disengagement of the clamping pairs from the welded sheets, the clamping and welding unit 12 starts advancing on the wheels 25 in the direction of the feed at a speed which is superior to the speed of the sheet advance. As soon as the unit 12 reaches the line of the welding joint, the aftertreatment process is initiated and the clamping and welding unit 12 proceeds at the same speed as the welded sheet belt. When the aftertreatment of the welding seams is finished, the entire unit returns to its initial position and a new welding cycle may be introduced.

With reference to FIGS. 2 and 3, a detailed structure of the heating and grinding unit according to the invention will now be described. This unit comprises a grinding disc 29 which is driven over a belt transmission 31 by an electromotor 30. The grinding disc 29 is seated on a carriage 32 which is adapted for horizontal movement on an elongated guide rail 33. A second electromotor 34 is mounted at the top portion of the carriage 32 to serve as a drive means for this carriage. In order that the grinding disc 29 might be vertically adjusted, it is slidably supported and guided on a guiding rod 35. Since the sheets must be firmly clamped during the grinding action, a gripping device is operatively arranged in the path of sheets below the heating and grinding unit. This gripping device comprises a lower gripping jaw 36 and an upper gripping jaw 37 between which the treated sheet band 38 is clamped. The lower gripping jaw 36 is seated on a vertical guiding column 39 and is disposed for a vertical movement that is effected hydraulically by means of two pistons 41 and pressure cylinders 40. By contrast, the upper clamping jaw 37 is hinged in order to perform a swinging movement with respect to the lower jaw 36. The upper jaw 36 is driven for its swinging motion by means of hydraulic driving cylinders 44 and pistons 43, which are linked to a lever 45. This lever 45 is firmly connected to the upper jaw 37 and lifts the same with the minimum power input. The upper jaw 36 is held in its clamping position by means of a locking mechanism 48 which is likewise controlled by a hydraulic cylinder 47 and a piston 46.

With reference to FIG. 3, the gripping surfaces of the gripping jaws 36 and 37 have an arched shape for increasing the rigidity of the clamped sheet during the grinding action. To secure a uniform load against the processed sheet, the lower grip jaw 36 is provided with an array of segments 49 which can be laterally displaced within a limited range. Because of the arched deformation of the clamped metal sheet or band, the grinding disc 29, as well as the burner must be guided on a correspondingly curved path during the heating and the grinding steps. For this purpose, there is provided guiding groove 51 which has the same arcuate shape as the gripping surfaces of the jaws 36 and 37. Within this groove 51 there are guided vertically arranged follower fingers 50 and 55 that are integral with vertically adjustable grinding disc 29 and the burner 55, respectively. A scale plate 57 is coupled to the vertical support of the grinding disc 29 to make it possible that the position of the grinding disc 29 can be readjusted according to the wear of the disc or to the height of the processed welding seams.

The heating device 52 is mounted on a carriage 54 which is moved principally in the same manner as the carriage 32 for the grinding device. The heating device 52 comprises a torch or a burner 53 which is supplied with a fuel gas, preferably with propane, and with oxygen. The burner 53 can be, as mentioned above, vertically adjusted and its carriage 54 is arranged for horizontal movement on the rail 33 in the same way as the carriage 32 of the grinding disc 29 is arranged. The follower finger 55 in the groove 41 maintains equal vertical distance of the burner 53 against the arcuate surface of the sheet.

As soon as heating the metal sheet is finished, the heating device 52 together with the grinding device 32 are removed to a rest position at the right hand side 56 of the guiding rail 33, and the grip of the gripping jaws 36 and 37 can be released, preferably by swinging the upper grip jaw 37 to its elevated position.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. An apparatus for welding metal sheets comprising
   a clamping device for gripping the sheets to be welded, a welding device combined with said clamping device into a first operative unit that is displaceable substantially in the path of movement of said sheets,
   a heating device operable for thermal pretreatment of the sheet edges, and for the thermal aftertreatment of the welding joints, a grinding device adjusted for leveling the welding joints, said heating device and said grinding device being combined into a second operative unit that is displaceable substantially in the path of movement of said sheets together with said first operative unit, thus forming with said first operative unit a single, centrally controlled operative system.

2. The apparatus according to claim 1, wherein said heating and grinding unit is situated at the inlet side of said clamping and welding unit, and is displaceable therewith in a horizontal plane.

3. The apparatus according to claim 1 wherein said heating device comprises vertical guide means supported on a carriage that is arranged for movement on a horizontal plane in the direction of said welding joint, and said vertical guide means supporting vertically adjustable burner means for thermal pretreating and aftertreating said metal sheets.

4. The apparatus according to claim 3 wherein said grinding device comprises vertical guide means that is supported on a carriage guided for a displacement in a horizontal plane in the direction of said welding joints, and said vertical guide means supporting a vertically adjustable grinding disc for grinding said welding joints.

5. The apparatus according to claim 1 wherein said heating and grinding unit further comprises a gripping device having upper and lower clamping jaws, and control means for said gripping device to grip and release the treated sheets.

6. The apparatus according to claim 5 wherein said lower clamping jaw is displaceable in vertical direction, and said upper clamping jaw is swingably supported on a hinge means.

7. The apparatus according to claim 5 further comprising a locking device controlled by a separate control means for locking said upper clamping jaw in a gripping position.

8. The apparatus according to claim 5 wherein the facing surfaces of said upper and lower clamping jaws have an arcuate form.

9. The apparatus according to claim 8 wherein the arcuate surface of said lower clamping jaw is provided with an array of side-by-side arranged segments that are laterally displaceable in a limited range to improve the gripping effect against said sheets.

10. The device according to claim 4 further comprising curved guiding means extending substantially parallel to the arched gripping surface of said gripping device, and follower means integral with the vertical guide means of said heating device and of said grinding device, respectively, said follower means engaging said curved guiding means to maintain equal distance of said burner means and of said grinding disc from said metal sheets.

* * * * *